US006845464B2

(12) United States Patent
Gold

(10) Patent No.: US 6,845,464 B2
(45) Date of Patent: Jan. 18, 2005

(54) PERFORMING OPERATING SYSTEM RECOVERY FROM EXTERNAL BACK-UP MEDIA IN A HEADLESS COMPUTER ENTITY

(75) Inventor: Stephen Gold, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 548 days.

(21) Appl. No.: 09/842,872

(22) Filed: Apr. 27, 2001

(65) Prior Publication Data

US 2002/0042892 A1 Apr. 11, 2002

(30) Foreign Application Priority Data

Oct. 6, 2000 (EP) ............................................ 00308840

(51) Int. Cl.[7] .............................................. G06F 11/00
(52) U.S. Cl. .............................. 714/6; 714/15; 711/162
(58) Field of Search .................... 714/6, 15, 2; 711/162

(56) References Cited

U.S. PATENT DOCUMENTS

| | | | |
|---|---|---|---|
| 5,269,022 A | 12/1993 | Shinjo et al. | |
| 5,469,573 A | * 11/1995 | McGill et al. | 717/127 |
| 5,708,776 A | 1/1998 | Kikinis | 395/185.08 |
| 5,713,024 A | 1/1998 | Halladay | 395/712 |
| 5,715,462 A | * 2/1998 | Iwamoto et al. | 717/173 |
| 5,745,669 A | 4/1998 | Hugard et al. | 395/182.01 |
| 5,829,045 A | 10/1998 | Motoyama | 711/162 |
| 5,960,445 A | * 9/1999 | Tamori et al. | 707/203 |
| 6,016,553 A | 1/2000 | Schneider et al. | 714/21 |
| 6,145,088 A | 11/2000 | Stevens | 714/2 |
| 6,170,055 B1 | 1/2001 | Meyer et al. | 713/2 |
| 6,173,417 B1 | * 1/2001 | Merrill | 714/15 |
| 6,195,695 B1 | * 2/2001 | Cheston et al. | 709/221 |
| 6,314,532 B1 | 11/2001 | Daudelin et al. | 714/38 |
| 6,385,707 B1 | 5/2002 | Maffezzoni et al. | 711/162 |
| 6,393,585 B1 | * 5/2002 | Houha et al. | 714/23 |
| 6,427,091 B1 | * 7/2002 | Davis et al. | 700/115 |
| 6,519,762 B1 | * 2/2003 | Colligan et al. | 717/170 |
| 6,543,004 B1 | * 4/2003 | Cagle et al. | 714/15 |
| 6,557,169 B1 | * 4/2003 | Erpeldinger | 717/173 |
| 6,625,754 B1 | 9/2003 | Aguilar et al. | 714/15 |

FOREIGN PATENT DOCUMENTS

| | | |
|---|---|---|
| EP | 0898225 A1 | 2/1999 |
| EP | 0917060 A1 | 5/1999 |
| EP | 0978785 A1 | 2/2000 |
| GB | 2336921 A | 11/1999 |
| GB | 2346719 A | 8/2000 |
| JP | 2000-035920 | 2/2000 |
| WO | 95/22794 | 8/1995 |

OTHER PUBLICATIONS

The Authoritative Dictionary of IEEE Standards Terms, 2000, IEEE Press, 7th Edition, p. 395.*
http://www.lanworks.com/bootservices/d_recovery.pdf, 3Com Dynamic Access Boot Services and Disaster Recovery Technical Paper, Jun. 21, 2000 (see pp. 1, 3 and 5).
http://www.pc.ibm.com/us/infobrf/configs1.html, Config-Safe Information Brief, 1998.

* cited by examiner

*Primary Examiner*—Robert Beausoliel
*Assistant Examiner*—Marc Duncan

(57) ABSTRACT

A computer entity, particularly but not exclusively a headless computer entity, has operating systems stored on a non-volatile data storage device e.g. a hard disk drive, and has a back-up data storage device. Operating system back-up's are taken from an uncorrupted copy of an operating system stored in a separate partition on the data storage device to the primary operating system which is actually used to run the device, thereby ensuring that if the primary operating system of the computer entity becomes corrupted either gradually or catastrophically, the back-up copy which is stored on a back-up media is not effected. Under failure conditions of the computer entity, a pristine copy of the operating system can be reloaded from the back-up tape data storage media and the computer entity rebooted from the pristine operating system back-up copy.

35 Claims, 13 Drawing Sheets

PERFORMING OPERATING SYSTEM RECOVERY FROM EXTERNAL BACK-UP MEDIA IN A HEADLESS COMPUTER ENTITY

FIELD OF THE INVENTION

The present invention relates to the field of computers, particularly although not exclusively, to a method for implementing back-up of an operating system to a computer entity.

BACKGROUND TO THE INVENTION

Headless computer entities, also known as "headless appliances" are known in the art. A known headless computer entity comprises a data-processor, memory, a plurality on input\output ports or the like, and an operating system. Headless appliances are generally designed without user interfaces, and lack a keyboard, pointing device e.g. mouse or track ball, and visual display monitor. This has the advantages both of reducing the cost of ownership, since the cost of a user interface hardware need not be borne by the purchaser, and also inhibiting interference with the operation of the appliance.

In a headless computer entity, human administrators are conventionally allowed only very limited access to the computer entity for maintenance, or in some cases no user maintenance is permitted. To safeguard against theft or loss of the computer entity involving loss of data, optionally a computer entity may have a back-up device, for example a tape back-up device such as DDS (Digital Data Storage) format back-up device. A back-up copy of an operating system of the computer entity may be made to the tape back-up device.

In a conventional computer entity where an operating system runs from a data storage device e.g. a hard disk, having re-write capability as opposed to read only memory, then there is a potential problem with backing up an operating system of the device onto a back-up medium e.g. tape, to provide for recovery of the computer entity after an operating system malfunction of "creeping corruption" of the back-up data. In particular, where an operating system fails gradually over a period of time, and back-up copies are made onto a separate back-up data storage medium, e.g. tape, periodically throughout the gradual period of operating system failure, then the operating system which is being backed up onto the back-up data storage medium is a corrupted or gradually corrupted version of the operating system Under conditions of operating system failure on the computer entity, the back-up copy of the operating system must be relied on to restore the corrupted operating system. However, if the operating system stored on the back-up medium is itself corrupted, or in a partially corrupted state immediately prior to failure, then there is no way of recovering the computer entity from an operating system failure using the back-up data storage media.

Whilst the above problem exists both for conventional computer entities having a visual display and keyboard user interface, and for headless computer entities having a user interface, the problem is less acute for conventional computer entities, because the operating system can be reloaded from an original CD ROM data carrier, using the user interface. However, for headless computer entities, because there is no user interface provided, the problem is more severe.

SUMMARY OF THE INVENTION

According to a specific implementation of the present invention, there are provided at least two copies of an operating system in a computer entity stored in a partitioned re-writable data storage device. A first (primary) copy of the operating system is used to actively control the computer entity. A secondary, copy of the operating system is used to operate the computer entity under conditions of failure or maintenance of the primary operating system. A further third copy of the primary operating system is stored on an operating system back-up partition of a re-writable data storage device, for example a disk drive or RAID array. The third copy of the operating system, is maintained as a pristine uncorrupted copy of the operating system, in its original manufactured state after installation into the computer entity.

Additionally, there are stored archived application configuration settings in a separate application setting archive partition of the data storage device.

When the operating system of the computer entity is backed up to an external data storage medium, for example a tape data storage medium for back-up purposes, the third copy of the operating system is backed up. Since the third copy of the operating system is known to be pristine and uncorrupted, and is not used for running the computer entity, there is maintained on the external back-up medium, a pristine uncorrupted copy of the operating system.

Therefore, it can be guaranteed that an uncorrupted version of the operating system can be reloaded into the computer entity from the tape data storage medium after an operating system failure of the computer entity.

This back-up copy is stored in addition to the first operating system used to run the computer entity, and the third operating system stored on the operating system back-up partition of the data storage device within the computer entity.

Upon restoring an operating system from a back-up data storage medium, the operating system is restored to the operating system back-up partition of the data storage device within the computer entity, and the application configuration settings are restored to the user settings archive partition, from which they were originally loaded onto the back-up data storage medium. Rebooting the computer entity then involve rebuilding the first copy of the operating system in a first data partition of the data storage device, from the operating system back-up area of the data storage device, with application configuration settings of the first copy operating system being rebuilt from the pristine copy application configuration settings stored in the user settings archive partition of the internal data storage device of the computer entity.

In a specific method according to the present invention to restore an operating system from the back-up media, before the pristine third copy operating system in the operating system back-up partition is overwritten, during a restore from back-up data storage medium operation, the original third copy of the operating system within the internal data storage device is first transferred from the operating system back-up partition to a "scratch" area (a reserved space partition) of the internal data storage device as a precaution against failure of the back-up operation from the back-up data storage medium. If a restore operation to restore the operating system from the back-up data storage medium to the operating system back-up partition of the internal data storage device fails, then the original third copy operating system, which was in the operating system backup partition can be restored from the scratch area of disk to which it has been copied. Without this facility, a failure during an operating system restore operation from a back-up data storage medium could result in a corrupted third copy of the operating system, stored in the operating system back-up partition. However, with this facility, any failure during the recovery operation from the back up media can result in the computer entity restoring to a known working configuration.

The first copy of the operating system is not always overwritten during recovery from the back-up data storage medium. During a back-up operation, version checking is performed, to compare a version of operating system already stored on the internal data storage device of the computer entity, with a version of operating system stored on the back-up data storage medium. If the version on the back-up data storage medium is a same major version, but a lower minor version, then recovery from the back-up data storage medium will overwrite the third copy of the operating system stored in the operating system back-up partition. If an operating system version stored on the internal data storage device has a same major version, but a more recent minor version, then the back-up data storage medium will not restore the third copy operating system, since the third copy operating system stored in the operating system back-up partition is a more recent version than that stored on the back-up data storage medium.

According to a first aspect of the present invention there is provided a method of performing a recovery operation of an operating system for a computer entity, said computer entity comprising:

at least one data processor; and at least one data storage device, wherein said data storage device is configured into a plurality of partition areas;

said method comprising the steps of:

copying a back-up operating system from a back-up source onto a operating system back-up area partition which is not used for direct running of an operating system by said computer entity;

copying a user settings data from said back-up source to a user settings archive partition area of said data storage device; and resetting said computer entity.

According to a second aspect of the present invention there is provided a method of storing a back-up operating system of a computer entity to a back-up media, said computer entity comprising a pristine copy of an operating system stored in an operating system back-up area data partition of a data storage device, and a primary operating system stored in a primary operating system partition area of said data storage device;

said method comprising:

copying a plurality of operating system files in a pristine manufactured state from said operating system back up area data partition onto a back-up media; and copying a set of configuration settings from a user settings archive partition area of said data storage device to said back-up media.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
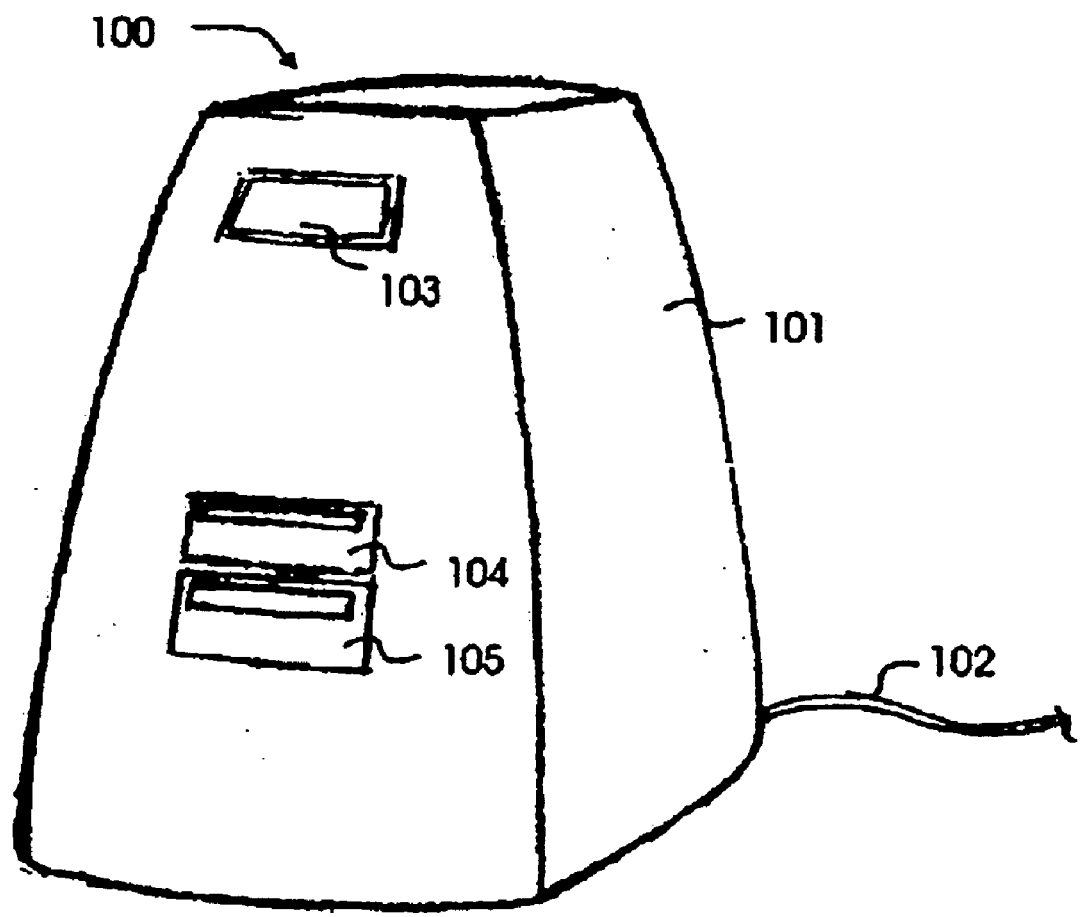
FIG. 1 illustrates schematically an external overview of a headless computer entity.

Referring to FIG. 1 herein there is illustrated schematically in perspective view a headless computer entity 100 comprising: a casing 101 containing a processor, memory, one or more data storage devices and one or more communications ports connectable to a local area network 102; a relatively small display screen, for example a liquid crystal (LCD) display 103 capable of giving limited status information for operations carried out by the computer entity, for example, POWER ON mode, a STAND BY mode, or other modes of operation; a data entry means 104, for example a CD ROM drive, and a back-up data storage device port 105, for example a digital data storage (DDS) format tape streamer.

A headless computer entity is not provided with a visual display monitor, pointing device e.g. mouse, or keyboard, or other direct user interface, and therefore is difficult for a human operator to interact with directly. In operation, the headless computer entity is intended to be self-managing and self-maintaining. Typically, a headless computer entity will provide a dedicated functionality within a network environment. Examples of headless computer entities include network attached storage devices.

Figure 2:
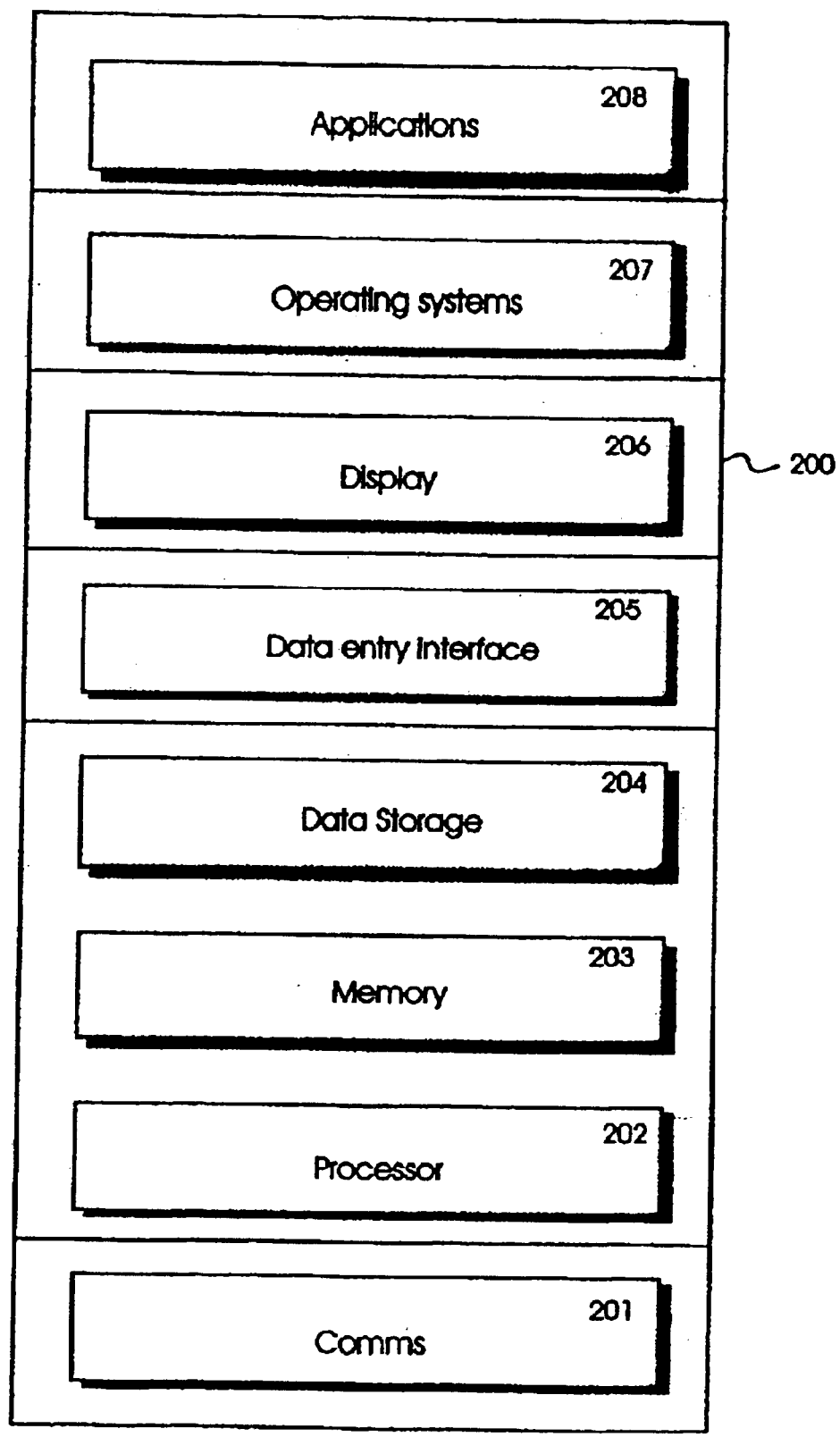
FIG. 2 illustrates schematically a hardware-firmware architecture of the headless computer entity of FIG. 1.

Referring to FIG. 2 herein, there is illustrated schematically an architecture of hardware and firmware components of the headless computer entity 200. The entity 200 comprises one or more communications ports 201; one or more data processing devices 202 as are known in the art; a memory 203 associated with the data processor(s); at least one data storage device 204, for example a hard disk data storage device, or an array of a plurality of hard disk data storage devices; an administration interface 205; a small display, e.g. a liquid crystal display device 206; a plurality of operating systems 207 as will be described herein after; and one or a plurality of application programs 208 providing functionality to the headless computer appliance.

Figure 3:
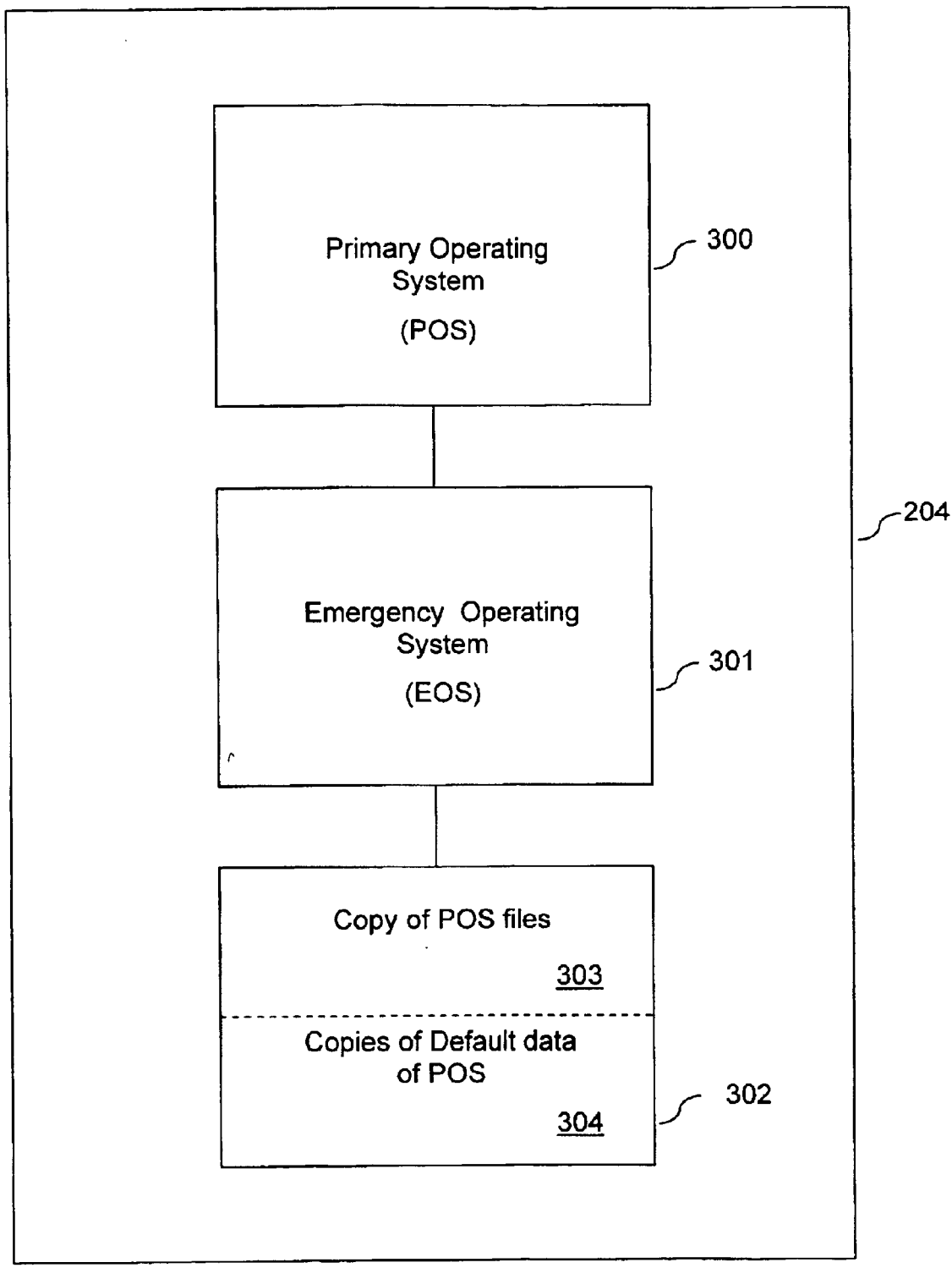
FIG. 3 illustrates schematically a logical architecture for storage of operating systems within an internal data storage device of the computer entity of FIG. 1.

Referring to FIG. 3 herein, there is illustrated schematically an overview of operating system 207 within the computer entity. The operating system 207 is stored on a non-volatile data storage device, for example a hard disk drive, or a RAID array. The operating system 207 comprises a primary operating system 300, which controls the computer entity under normal operation; an emergency operating system 301 which controls the computer entity at times when the primary operating system 300 is incapable of running the computer entity, for example during a failure of the primary operating system 300, or during an upgrade or replacement of the primary operating system 300; and a copy 302 of the primary operating system, comprising a copy 303 of the code files comprising the primary operating system itself, and copies 304 of default data of the primary operating system.

After a failure of the computer entity primary operating system or if the primary operating system 300 is upgraded, or restored from a back-up data storage device, the primary operating system 300 is restored directly from the copy of the primary operating system files 303 and the default data of the primary operating system 304.

Figure 4:
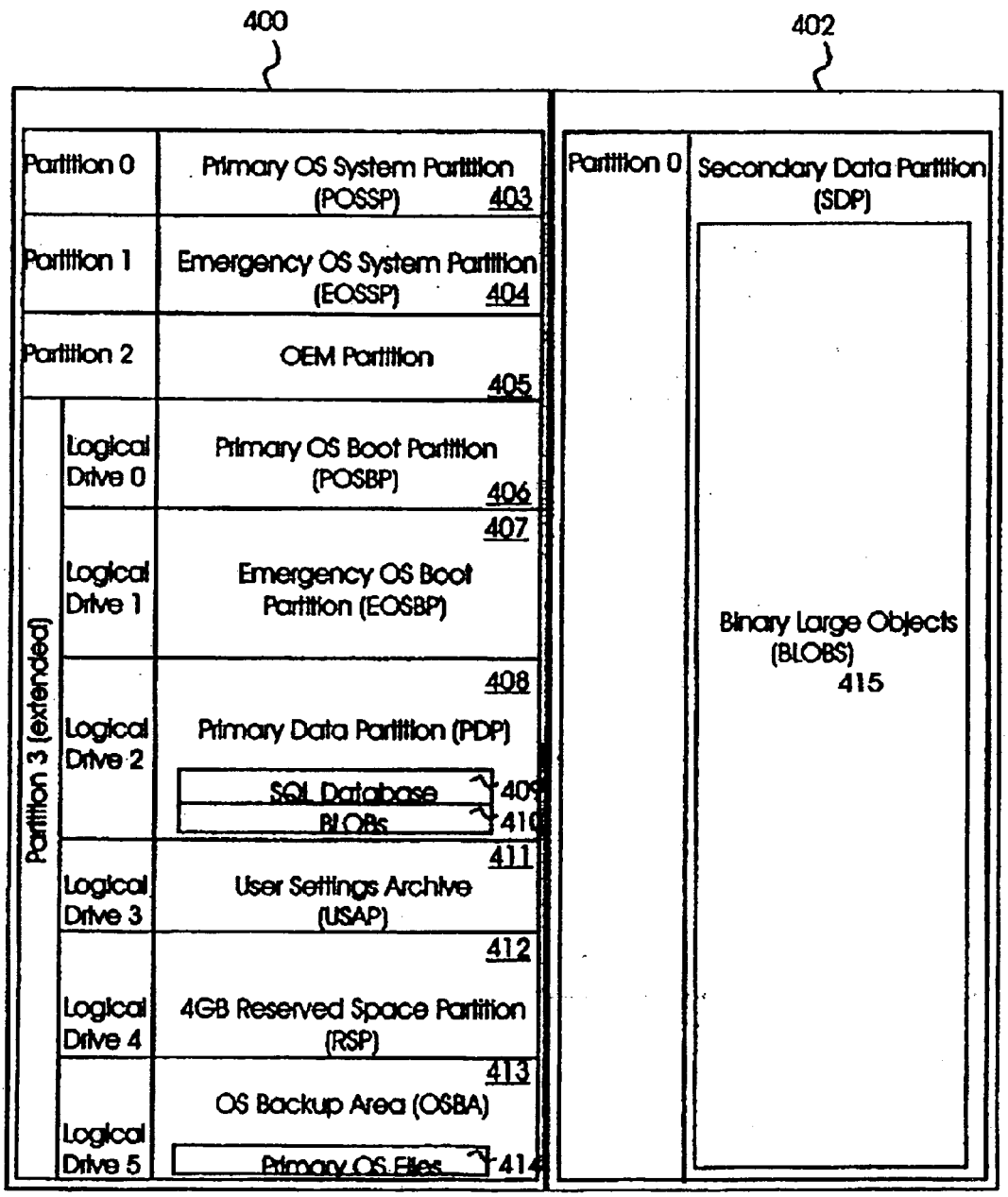
FIG. 4 illustrates schematically a data storage device partition of the computer entity of FIG. 1.

Referring to FIG. 4 herein, there is illustrated schematically a format of data storage device 204 that stores operating systems 207. The data storage device is partitioned into a plurality of partitioned areas of partitions and sub-partitions, a primary partition 400 and a secondary partition 402. Within the primary partition 400 are a plurality of sub partitions including a primary operating system system partition 403 (POSSP), containing a primary operating system of the computer entity; an emergency operating system partition 404 (EOSSP) containing an emergency operating system under which the computer entity operates under conditions where the primary operating system is inactive or is deactivated; an OEM partition 405; a primary operating system boot partition 406 (POSBP), from which the primary operating system is booted or rebooted; an emergency operating system boot partition 407 (EOSBP), from which the emergency operating system is booted; a primary data partition 408 (PDP) containing an SQL data base 409, and a plurality of binary large objects 410, (BLOBs); a user settings archive partition 411 (USAP); a reserved space partition 412 (RSP) typically having a capacity of the order of 4 gigabytes or more; and an operating system back up area 413 (OSBA) containing a back up copy of the primary operating system files 414. The secondary data partition 402 comprises a plurality of binary large objects 415.

Figure 5:
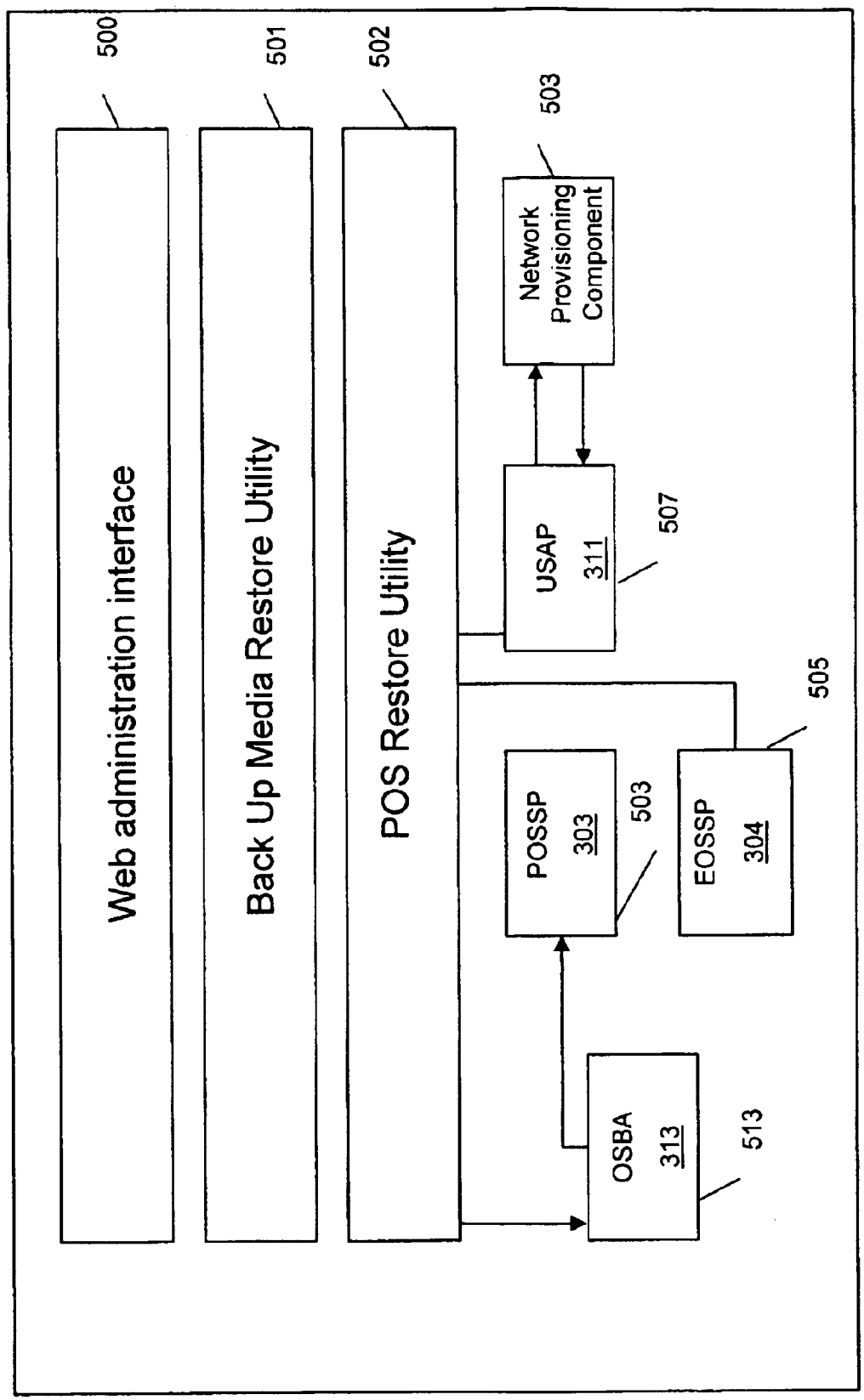
FIG. 5 illustrates schematically logical components cooperating to perform a s restore operation from a back-up data storage medium.

Referring to FIG. 5 herein, there is illustrated schematically an interaction between a plurality of applications 208 and the operating systems 207, for carrying out a back-up operation to back-up a primary operating system of the computer entity, and a restore from back-up data storage medium to restore an operating system of the computer entity. Applications 208 comprise a web administration interface 500 over which a user can activate back-up data storage including back-up of an operating system to a back-up data storage device; a back-up media restore utility 501 for controlling restoration of back-up data including a back-up operating system from a back-up media; a primary operating system restore utility 502 for restoring a primary operating system; and a network provisioning component 503.

In this document the term "back-up media" is used to describe any type of back-up media which is removable from a computer entity and can be taken away from the computer entity. Examples of back-up data storage media include tape data storage devices, writable CD ROM devices, ZIP® drives, SPARC® drives, removable hard disk drives (HDD) or the like. In the specific embodiment described herein, a tape back-up data storage device is used however, it will be understood by those skilled in the art that this device could be replaced by any suitable type of back-up data storage device.

Figure 6:
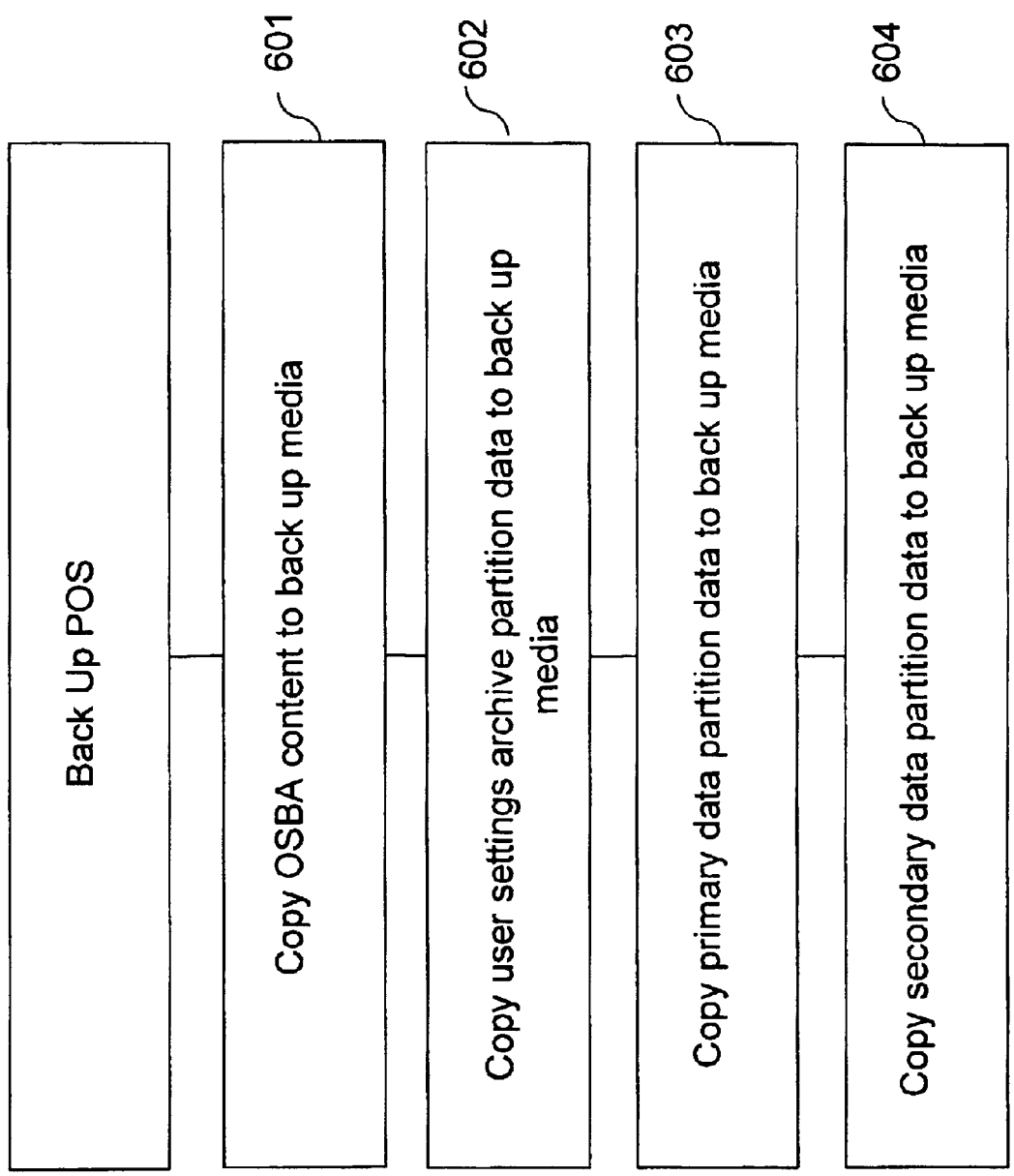
FIG. 6 illustrates schematically steps carried out to create a back-up of an operating system, onto a back-up media.

Referring to FIG. 6 herein, there is illustrated schematically a back-up process for backing up the primary operating system of the computer entity onto a back-up data storage media. In step 601, a copy of primary operating system files 414 stored in the operating system back-up area 413 is transferred on to the back-up media. Because the copy of the primary operating system files 414 stored in the operating system back-up area is a pristine uncorrupted copy of the primary operating system and is different from the copy of the primary operating system stored in the primary operating system system partition 403 which is used to run the computer entity, the primary operating system files 314 in the operating system back-up area 413 are uncorrupted, irrespective of the status of the primary operating system stored in the primary operating system partition 403.

In step 602, the content of the user settings archive partition 411 is copied onto the back-up data storage media. The data in the user settings archive partition 411 comprises data which describes a way in which a user has set up the primary operating system. Therefore backing up the current data in the user settings archive partition effectively backs up the current settings of the primary operating system which is used to run the computer entity. Therefore in the back-up operation to the data storage media, there is backed up firstly a pristine copy of the primary operating system, which has not been used operationally in the computer entity and therefore remains uncorrupted, and secondly the user settings for configuring the primary operating system, which are stored in a separate partition on the internal data storage device from both the pristine copy of the operating system files 414, and from the active primary operating system stored in the primary operating system system partition 403.

In step 603, the content of the primary data partition is copied to the back-up data storage medium; and in step 604 the content of the secondary data partition, comprising a plurality of binary large objects 415 is copied to the back-up data storage media.

Each computer entity stores a license key, authorizing a number of users, outside of the data partitions used to store the primary operating system or the copy of the primary operating system in the operating system back-up area. Therefore, during a back-up operation, there is no need to back-up the license key data. Further, the license key data of high license number machine can not be backed up onto a different machine, expanding that machines licensed capabilities, and hacking of a license key on the back-up data storage medium is avoided since the license is not stored on the back-up data storage medium.

There will now be described operation of the computer entity for recovery of an operating system from a back-up data storage media. Under conditions of disaster recovery, the back-up data storage media is inserted into the back-up data storage device 105. The back-up media contains the backed up contents of the operating system back-up area 413, the user settings archive partition 411; the primary data partition 408; including the SQL database 409; binary large objects 410; and the secondary data partition 402 including further binary large objects 415. In other words, the back-up media contains user data, user settings, and a pristine copy of the primary operating system.

Under control of an operator, accessing the computer entity via web administration interface 500 and whilst running the primary operating system 300, the back-up media restoration utility 501:

Restores a pristine copy of the operating system, the user settings, and data back onto the data storage device of the computer entity. During this operation, a previous content of the operating system back-up area 413 is copied to the reserved space partition 412 to safeguard against errors during the recovery from back-up media.

Once the operating system, user settings and data are recovered from the back-up media, there is initiated a reset operation of the computer entity, with data preserved, under control of the user via the web administration interface 500 and effected by the primary operating system restore utility 502. During the restore operation, control of the computer entity is handed over to an emergency operating system.

During the restoration from the back-up media, checks are made to ensure that the operating system on the back-up media is compatible with the hardware of the computer entity. During the restoration from back-up media, events are copied to an alert log, if errors occur.

Figure 7:
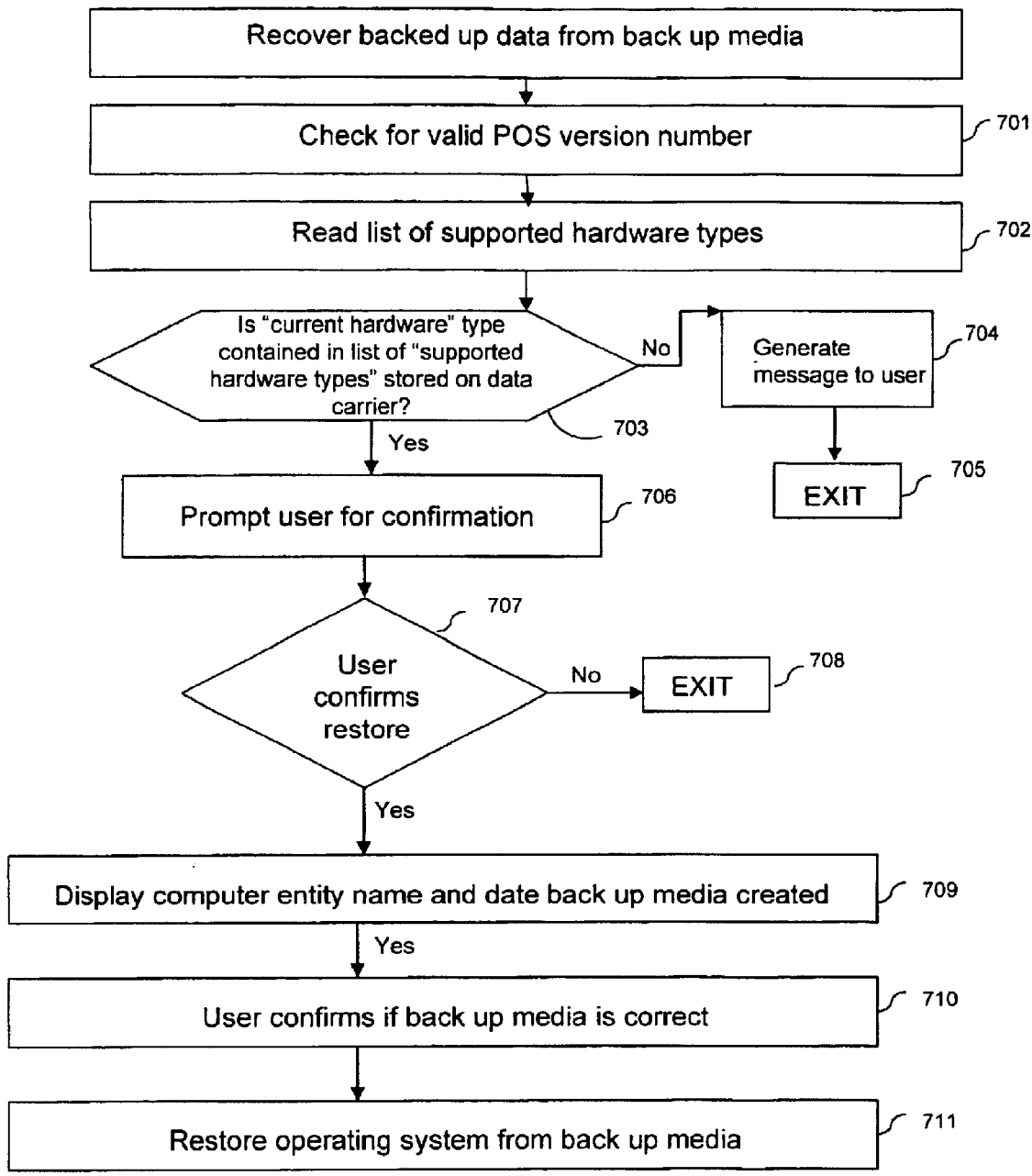
FIG. 7 illustrates schematically steps for initiating a recovery from a back-up data storage medium.

Referring to FIG. 7 herein, there are illustrated process steps carried out for recovering backed up data from the back-up data storage media. A user initiates the process by accessing the web administration interface from a remote computer, and by inserting the back-up data storage media into the back-up data storage device 105. The web administration interface displays a series of prompt displays to the user and displays a dialogue box for receiving instructions from a remote user interface. In step 701, the back-up media restore utility 501 checks the back-up data storage media for a valid primary operating system version number. In step 702, the back-up media restore utility reads a list of supported hardware types from the back-up data storage media. If, in step 703, currant hardware type data stored on the computer entity is not contained in a list of supported hardware types stored on the back-up data storage media, then in step 704, the back-up media restore utility generates a message to the user that the operating system stored on the back-up data storage media is incompatible with the current computer entity hardware. This may occur where, for example, the computer entity has had to be replaced after theft of an original computer entity from which data was backed up onto the back-up data storage media, or where components of the computer entity have been replaced with new components which are incompatible with the previous components of the computer entity. Provided, in step 703, that the current hardware type of the computer entity is on the list of supported hardware types stored on the data carrier, then in step 706, the back-up media restore utility 501 generates a prompt message to the user to confirm proceeding with the restore operation. This message is displayed to the user via the web administration interface 500. If the user does not confirm or cancels the restore operation in step 707, then in step 708, the back-up data restore utility exits the procedure. However, in step 709, if the user confirms proceeding with the restoration from the back-up media, the restore utility displays the name of the computer entity and the date on which the back up media was created. This is to allow a final user confirmation that the back up media being used is the correct one. In step 710, the user may confirm whether the back up media is the correct one and, following a positive confirmation in step 710 via the web administration interface 500, the utility proceeds to restore the operating system from the back up media in step 711.

Figure 8:
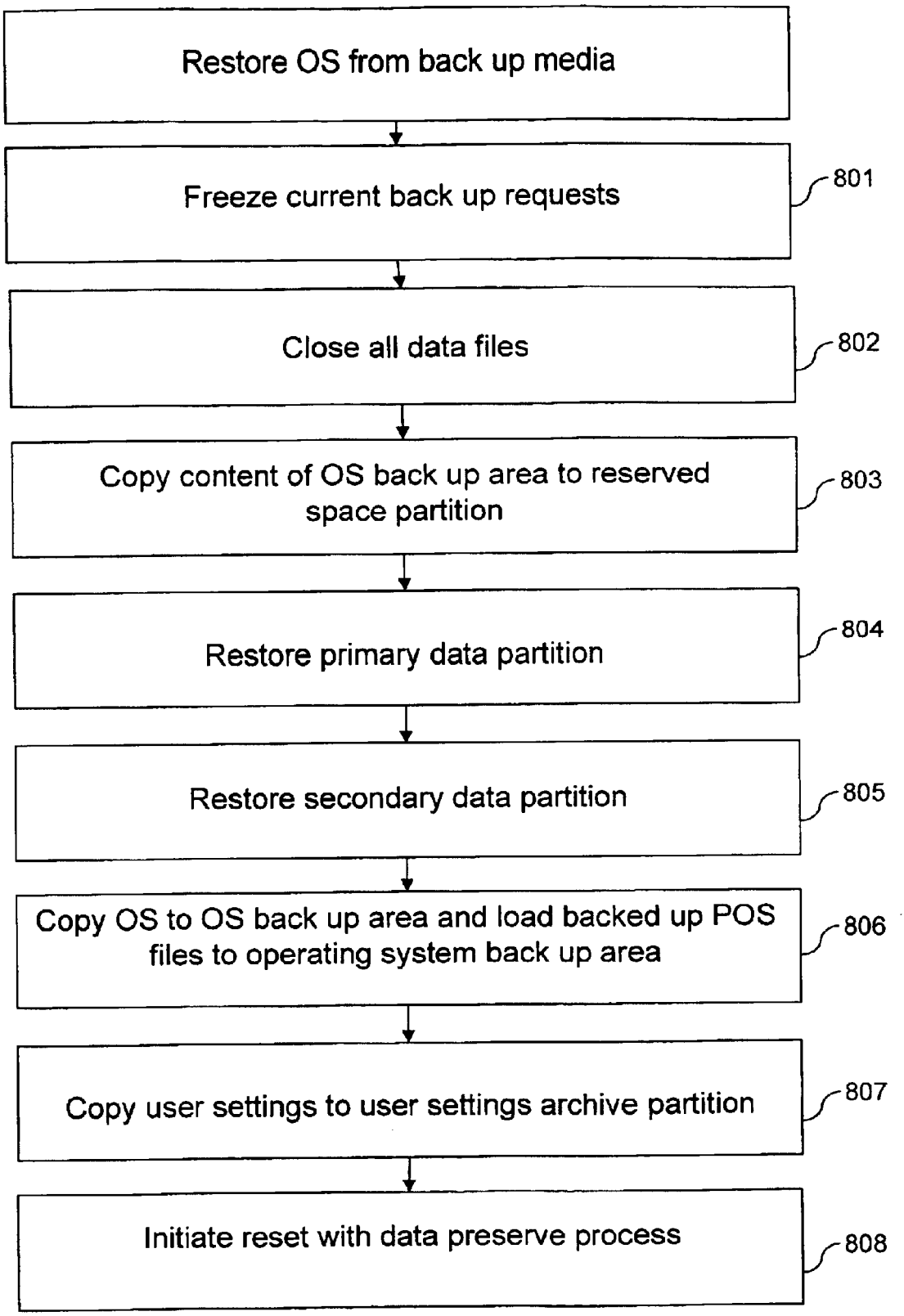
FIG. 8 illustrates schematically an operation carried out by the computer entity for restoring an operating system from a back-up media.

Referring to FIG. 8 herein, there are illustrated schematically main process steps in a method for restoring the operating system from the back-up media. During the recovery from back-up media operation, the primary operating system runs the recovery algorithm. The back-up utility is an application running on top of the primary operating system. In step 801, the back-up media restore utility 501 freezes any current back-up requests which may be in operation on the computer entity to prevent any further backing up to the data partitions that are about to be overwritten by the restore process. In step 802, the back-up media restore utility closes all the data files which are currently open on the computer entity. In step 803, the current contents of the operating system back-up area 413, that is in the operating system 414 currently contained in the operating system back-up area, are copied into the reserved space partition 412. This is to ensure that if the back-up procedure fails and the data within the operating system backup area 413 is corrupted, the original content of the operating system back-up area prior to restoration from back-up media, which has been stored in the reserved space partition 412, can be recovered. Therefore, effectively the position immediately prior to a failed back-up can be recovered from the pristine copy of the operating system stored in the reserved space partition 412. In step 804, the primary data partition 408 is restored for the data contained on the backup data storage media. In step 805, the second data partition is restored from the data stored on the back-up data storage media. Steps 804 and 805 are user selectable via the web administration interface 500. A user may wish to restore only the operating system, without restoration of data on the computer entity. In step 806, the back-up media restore utility copies the operating system from the back-up data storage media onto the operating system back-up area 413 and loads the primary operating system files 414 which have been backed up onto the back-up data storage media onto the operating system back-up area 413. In step 807, the user settings are copied from the back-up data storage media to the user settings archive partition 411. In step 808, the back-up media restore utility 501 initiates a reset with user data preserve operation 1000, as will be described hereinafter, in order to reset the computer entity from the back-up copy operating system recovered from the back-up data storage medium.

Figure 9:
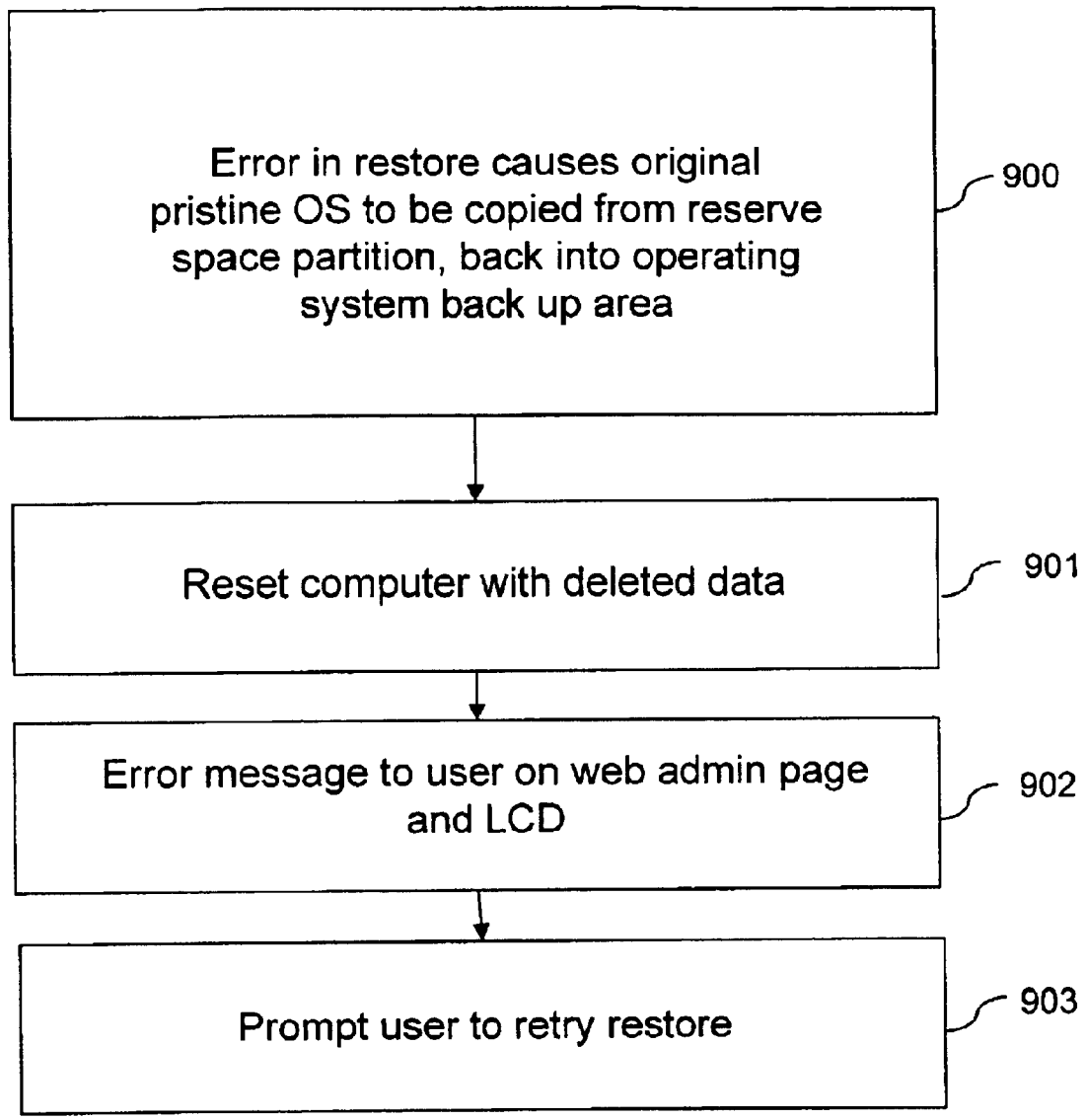
FIG. 9 illustrates schematically a procedure for alerting a user to errors in the restoration process of FIG. 8.

Referring to FIG. 9 herein, there is illustrated schematically a procedure which runs in parallel with the restoration procedure of FIG. 8, and is activated if an error in the operating system restoration procedure of FIG. 8 occurs. If an error in the operating system restoration procedure of FIG. 8 occurs, the error handling sequence of FIG. 9 is entered during step 900, causing the pristine copy of the operating system files which were copied from the operating system back-up area 413 to the reserved space partition area 412 in step 803 to be copied back to the operating system back-up area 413, thereby ensuring that a valid operating system is contained in the operating system back-up area 413, before a reset with data delete procedure is activated. In step 901, a reset with data delete procedure is activated, in which the computer entity is reset with deletion of data, which puts the computer entity into a known good state, with system data in a known good state. In step 902, after performing the reset with data deletion, the utility displays an error message on the administration web page, and on the liquid crystal display interface, to alert the user that the tape recovery has failed. In step 903, the utility prompts the user via the web administration interface to retry data recovery with another, different tape set.

In a case of a restore from back-up media where a known digital data storage (DDS-4) autoloader is used, where a plurality of tape data storage media are loaded into a plurality of slots in an autoloader device, the back-up media restore utility 501 should automatically load the correct back-up tapes in the correct order. Therefore, in a case where a user has replaced the tapes in a slot magazine of an autoloader in the wrong order, and so the back-up media restore utility 501 can not assume that the first tape in a set of tapes is in a first slot in a set of slots and the second tape is in the second slot etc., an algorithm comprising the backup media restore utility checks which tape is in which slot and loads data from the tapes in the correct order.

Figure 10A:
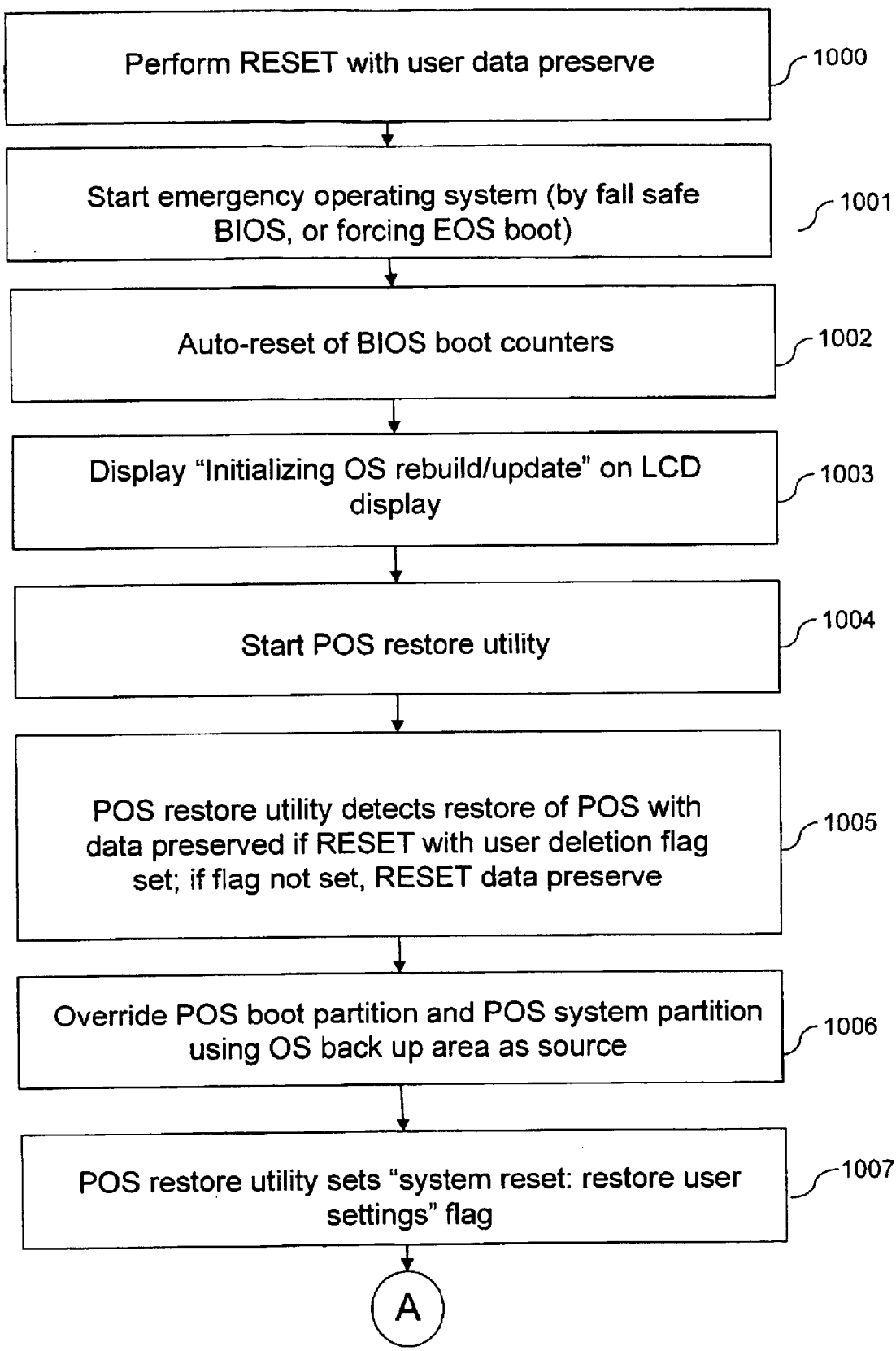
FIG. 10 illustrates schematically a method carried out by the computer entity for performing a reset of the computer entity, with user data being preserved.
Figure 10B:
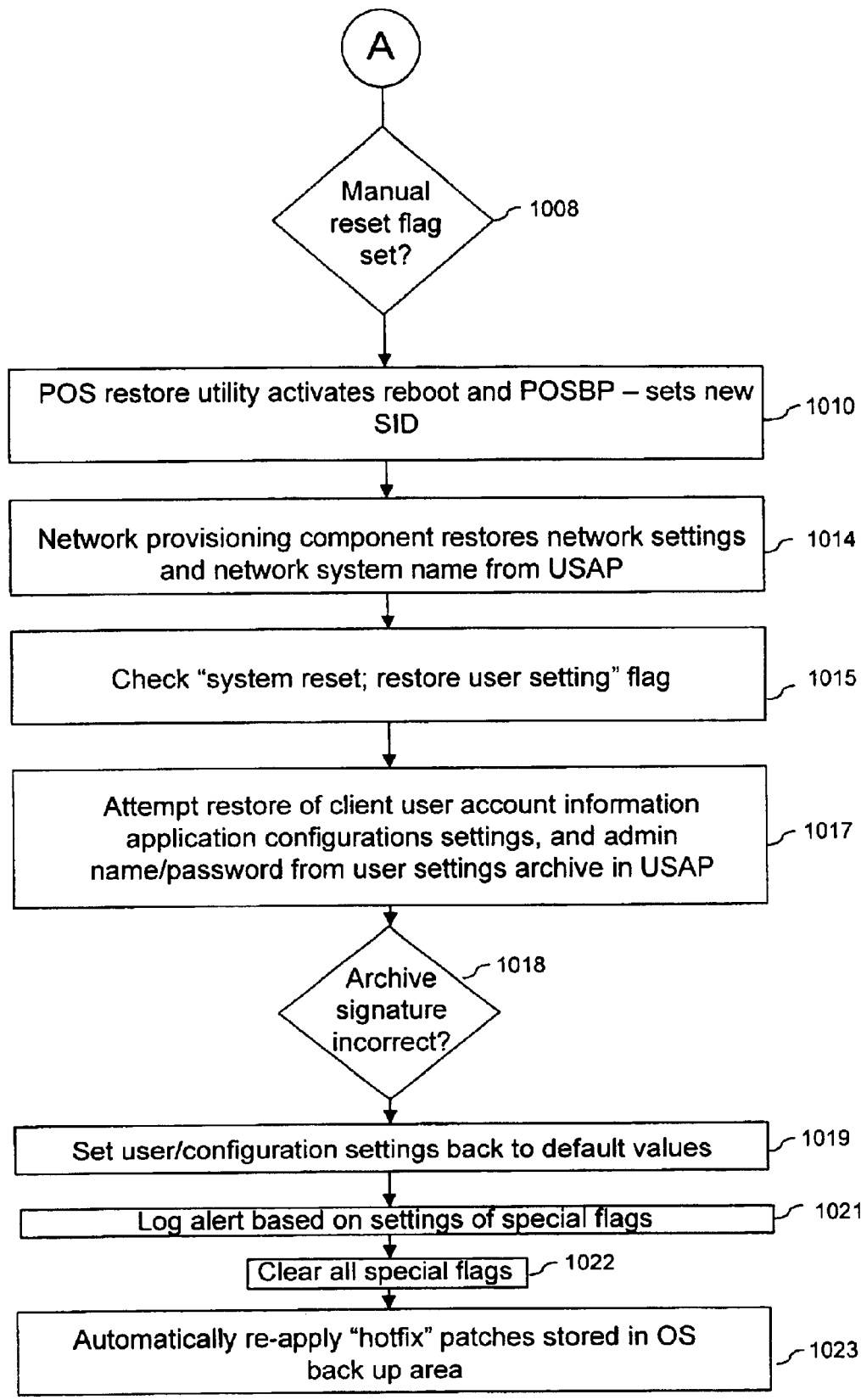

Referring to FIG. 10 herein, there are illustrated process steps for carrying out a RESET with user data preserved operation 1000. During rebuilding of the primary operating system, the computer entity runs under control of the emergency operating system. In step 1001, the emergency operating system is started, either by a failsafe BIOS or by the installation component forcing the emergency operating system to boot from the emergency operating system boot partition 307. In step 1002, the emergency operating system successfully booting results in an automatic reset of a BIOS boot counter. In step 1003, there is displayed an "initializing operating system rebuild\update" message on the liquid crystal display 103. In step 1004, a primary operating system restore utility 502 is started. In step 1005, the primary operating system restore utility 502 detects that restore of the primary operating system with preserve of data to be effected due to a "RESET with user data deletion" flag is being read. If the flag is not set, then the reset with data preserve operation is effected. In step 1006, the primary operating system restore utility 1003 overrides the primary operating system boot partition 406 and the primary operating system system partition 403 using the content of the operating system back-up area 413 as its source. Since the content of the operating system back-up area has been loaded with a pristine copy of the primary operating, this effectively overwrites the primary operating system system partition 403 and primary operating system boot partition 406 with is the new version primary operating system which had been loaded in from the data carrier. In step 1007, the primary operating system utility 502 sets an "system reset: restore user settings" flag. In step 1008 (FIG. 10B, it is checked whether the "manual reset" flag is set, and if so, then the primary operating system restore utility 502 sets a "system reset: manual initiation" flag and then clears the "manual reset" flag. In step 1010, the reboot is activated by the primary operating system restore utility 502 activating an automatic reboot to the primary operating system, from the primary operating system boot partition 406, which sets a new system identification (SID). After the system identification is set, network provisioning component 503, during operation 1014, restores network settings and network system names from the user settings archive partition 411. Use of a new SQLBOOT.DLL file avoids problems due to changing the system name. Performing an automatic reboot enables network settings to be restored in step 1014. In step 1015, the "system reset: restore user setting" flag is checked. If the flag is set, then in step 1017, there is an attempted to restore client user account information, application configuration settings, and administration name\password from the user settings archive data stored in the user settings archive partition 411. If the archive signature is incorrect in step 1018, then the user\configuration settings should be set back to default values in step 1019, and an alert should be logged to this failure in step 1021 based upon the settings of the special flags. In step 1022 all special flags are cleared and in step 1023, the primary operating system restore utility 502 automatically reapplies any "hot fix" patches which are stored in the operating system back-up area 413.

Figure 11:
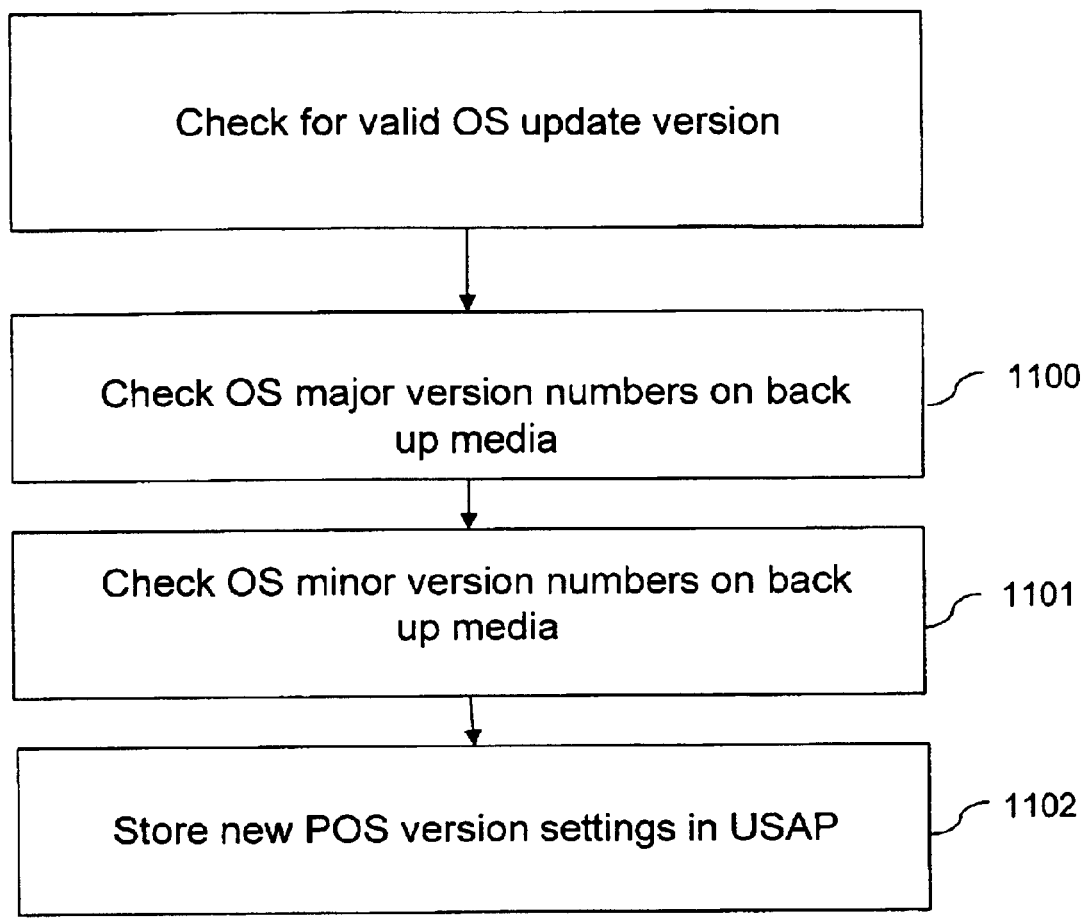
FIG. 11 illustrates schematically an overview of a process for checking a valid operating system update version on a back-up data storage medium.

Referring to FIG. 11 herein there is illustrated schematically process steps for a version control which checks for valid operating system version. In step 1100 the back-up media restore utility 501 checks the operating system major version number from the operating system version on the back up media In step 1101, there is checked an operating system minor version number from the operating system version stored on the back up media. In step 1102, primary operating system version settings read from the back-up media are stored in the user settings archive partition 411, depending upon the results of steps 1100 to 1101.

The version control operates to ensure that incompatible primary operating system updates are not applied to the computer entity. The primary operating system version numbering scheme uses a major version and a minor version number, for example in the format XX.YY as follows: The primary operating system major version number (XX) is incremented when a new primary operating system build has:

major changes to user data structure such that automatic data upgrade functionality is not supported, for example moving from SQL server version 7 to version 8; or has hardware dependencies that are not compatible with an existing hardware type of the computer entity.

Each major version number will have a list of supported computer entity hardware types on which that operating system version will run.

A primary operating system minor version number is incremented when a new primary operating system build has any of:

additional functionality (that is it is compatible with a major revision supported hardware type);

has changed a base operating system to a new, but still compatible version, for example moving from Microsoft NT4 to Microsoft Windows 2000®;

has patches for bug fixes;

has updates to device drivers which are backwards compatible with all variants of a major revision supported hardware types;

Updates to a primary operating system which is incompatible with a hardware type of the computer entity to which loading is attempted are prevented by means of a hardware type number. The hardware type number is stored in a capacity license "raw disk" sector of the data storage device of the computer entity. This hardware type number is read in step 702. Hardware types include different types of computer entity, for example which have different data storage capacities or different application functionality. Hardware components within a particular hardware type can be changed without changing the hardware type number so long as they perform exactly the same function, that is for example changing one CD ROM reader device for another CD ROM reader device. This means that a current hardware type must be stored during a back-up operation on back-up tape device 105 to ensure that the back-up tape can only be restored onto the same type of hardware on which the back-up was created. The hardware type data read from the raw disk sector is compared with the supported hardware types of the operating systems stored on the data carrier in step 703.

By applying a version control in the restore procedure, it is ensured that the computer entity can not be downgraded in operating system to an earlier operating system version. Further, if a later version computer entity hardware replaces a previous version computer entity, then the operating system corresponding to the latest version computer entity and not overwritten by an earlier operating system version corresponding to an earlier version computer entity. For example where a computer entity using operating system version 1.0 is damaged irreparably, or stolen, and it is required to restore from a back-up data storage medium, onto a new version computer entity, where the new version computer entity is designed to operate with a later version op, e.g. version 1.1 or above, then version control prevents the new computer entity being loaded with the back-up operating system version 1.0. The operating system back-up area on the new computer entity containing a more recent operating system version, e.g.1.0 or above, can not be overwritten by the back-up operating system version 1.0. Therefore, operating system downgrades are prohibited.

If, during a restore with data preserve operation, there is detected an earlier operating system version data, e.g. data written in back-up operating system version 1.0, but the computer entity is a new entity having a later operating system version. e.g. version 1.1 or above, then the later minor version incremented operating system stored on the operating system back-up area of the computer entity automatically upgrades the data recovered from the back-up data storage medium to the new operating system minor version upgrade. Therefore, it is always ensured that after a recovery from back-up data storage medium, the latest version operating system within the computer entity it used.

Figure 12:
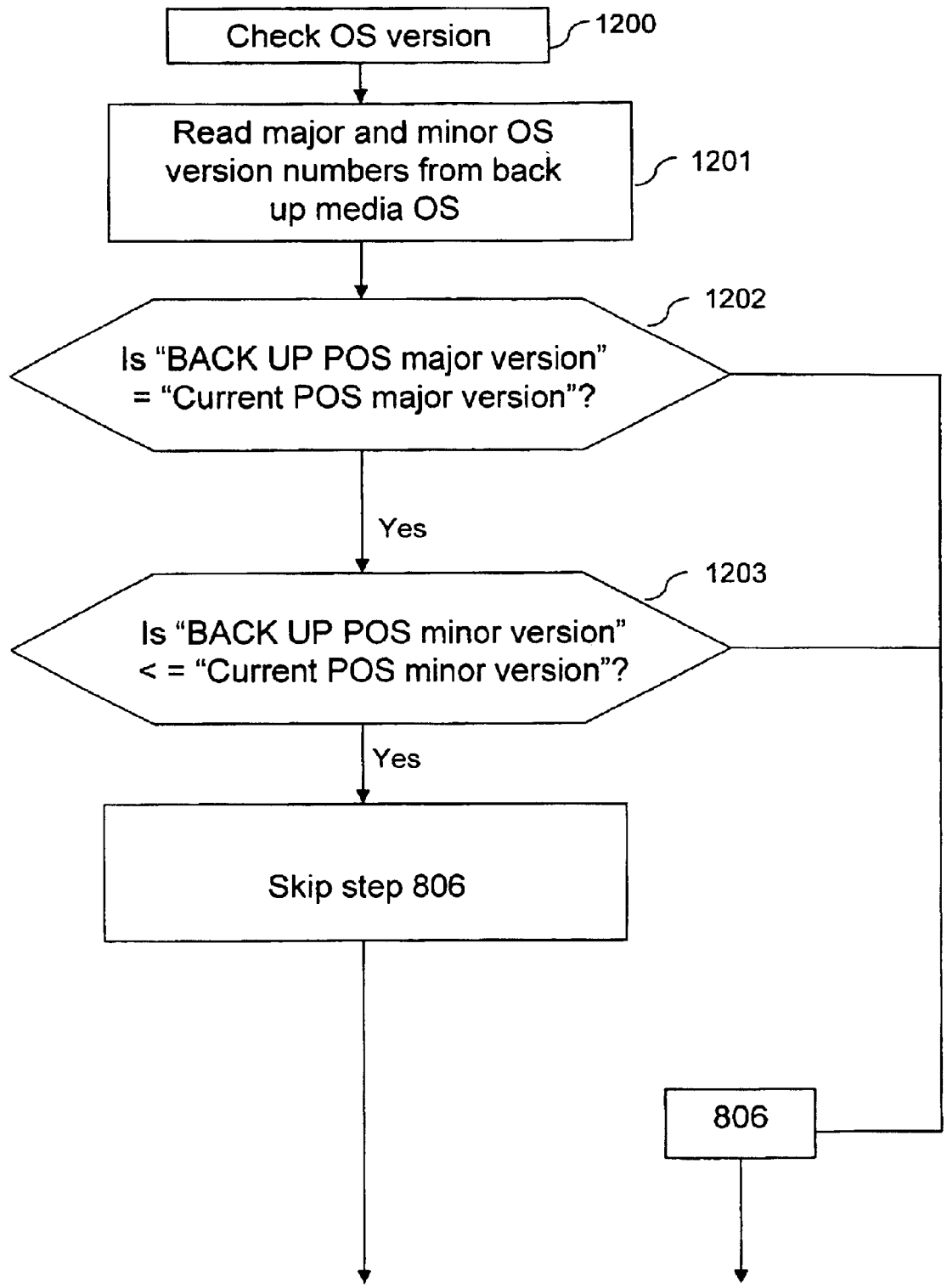
FIG. 12 illustrates schematically a sub-routine of the operating system validity check process of FIG. 11, for checking a major operating system update.

Referring to FIG. 12 herein, there is illustrated schematically a process 1200 followed for checking an operating system version stored on the back-up data storage media. The operating system stored on the back-up data storage media is only restored to the operating system back-up area partition 413, if the version stored on the back-up data storage media is an equal or greater version of operating system than is already stored on the computer entity. In step 1201, the major and minor version numbers of the operating system are read from the operating system stored on the back-up media. In step 1202, if the major version number of the primary operating system stored on the back-up media (back-up POS major version) is equal to the major version of the current primary operating system stored on the computer entity (current POS major version), then in step 1203, the minor versions are checked. In step 1203, if the minor version of the operating system stored on the back-up data storage media is less than or equal to the current primary operating system minor version stored on the computer entity (current POS minor version), then step 806 is skipped, so that the operating system files on the back-up data storage medium are not restored to the operating system back up area on the computer entity, thereby avoiding a minor operating system version downgrade. If any other operating system version combination is detected, then in step 806 the operating system version stored on the back-up data storage media is restored to the operating system back-up area 413 stored on the computer entity, so that the operating system version on the computer entity matches that on the back-up data storage media.

What is claimed is:

1. A method of performing a recovery operation of an operating system for a computer entity, said computer entity comprising:

a data processor arrangement; and at least one data storage device, wherein said data storage device is configured into a plurality of separate partition areas, a first of said areas being an operating system back-up area partition which is not used for direct running of an operating system by said computer entity, a second of said areas being a user setting archive partition area;

said method comprising causing the data processor arrangement to perform the steps of:

copying a back-up operating system from a back-up source onto the operating system back-up area partition which is not used for direct running of an operating system by said computer entity;

copying user settings data from said back-up source to the user setting archive partition area of said data storage device; and resetting said computer entity.

2. The method as claimed in claim 1, wherein another of said areas of said data storage device is a reserved space partition area, and further comprising causing the data processor arrangement to perform the step of:

prior to said step of copying said back-up operating system to said operating system back-up area partition, copying content of said operating system back-up area partition into the reserved space partition area of said data storage device.

3. The method as claimed in claim 1, wherein a further one of said areas of said data storage device is a primary operating system partition area, and further comprising causing the data processor arrangement to perform the step of:

copying said back-up operating system from said operating system back-up partition area to the primary operating system partition area of said data storage device, wherein said step of resetting said computer entity comprises (a) rebooting from said back-up copy operating system copied to said primary operating system partition, and (b) copying said user settings data from said user settings archive partition.

4. The method as claimed in claim 1, wherein additional ones of said areas of said data storage device are one or more secondary data partitions and a secondary data partition area that is a data partition area for storage of data, and further comprising the step of:

copying user data from said back-up source to one or more data partitions of said data storage device, storing data in the secondary data partition area.

5. The method as claimed in claim 1, wherein an added one of said areas of said data storage device is an emergency operating system partition area and said step of resetting said computer entity comprises causing the data processor arrangement to perform the steps of:

forcing said computer entity to boot from an emergency operating system stored on the emergency operating system partition area of said data storage device;

overwriting content of said primary operating system partition with said back-up operating system stored in said operating system back-up area partition; and restoring client and application configuration settings from said user settings archive partition area.

6. The method as claimed in claim 1, wherein said step of resetting said computer entity comprises:
   resetting said computer entity, including deleting application and user configuration setting data; and
   restoring said user configuration setting data from said user settings archive partition area.

7. The method as claimed in claim 1, further comprising causing the data processor arrangement to perform the step of:
   storing event data describing at least one event of said recovery operation if an error occurs in said recovery operation.

8. The method as claimed in claim 1, wherein a further one of said areas of said data storage device is a primary operating system partition area reserved for use by said primary operating system and an additional one of said areas of said data storage device is a reserved space partition, and further comprising causing the data processor arrangement to perform the step of:
   if an error occurs in said recovery operation, restoring a primary operating system to the primary operating system partition area reserved for use by said primary operating system, the primary operating system being restored from a copy of said primary operating system temporarily stored in the reserved space partition of said data storage device.

9. The method as claimed in claim 8, wherein said step of resetting said computer entity comprises deleting user settings data.

10. The method as claimed in claim 1, further comprising causing the data processor arrangement to perform the steps of:
    restoring said operating system back-up area partition of said data storage device; and
    restoring at least one user data partition area.

11. A computer-readable medium or storage device containing computer-executable instructions for causing the computer entity of claim 1 to perform the steps of claim 1, wherein the computer entity is a headless computer.

12. A method of performing a recovery operation of an operating system for a computer entity, said computer entity comprising:
    at least one data processor; and
    at least one data storage device, wherein said data storage device is configured into a plurality of partition areas,
    said method comprising the steps of:
      copying a back-up operating system from a back-up source onto an operating system back-up area partition which is not used for direct running of an operating system by said computer entity;
      copying user settings data from said back-up source to a user setting archive partition area of said data storage device;
      checking a version of said back-up operating system stored on a back-up data storage media; and
      comparing said operating system version, with a hardware of said computer entity; and
      resetting said computer entity.

13. The method as claimed in claim 12, wherein said step of checking a version of said back-up operating system with hardware of said computer entity comprises:
    reading a list of supported hardware types from said operating system stored on said back-up media;
    comparing said read list of supported hardware types with current hardware-type data stored on said computer entity; and
    if said current hardware-type data stored on said computer entity is incompatible with said read list of supported hardware types, generating an error message.

14. A computer-readable medium or storage device containing computer-executable instructions for causing the computer entity of claim 12 to perform the steps of claim 12, wherein the computer entity is a headless computer.

15. A method of storing a back-up operating system of a computer entity to a back-up media, said computer entity comprising a pristine copy of an operating system stored in an operating system back-up area data partition of a data storage device, and a primary operating system stored in a primary operating system partition area of said data storage device, said method comprising:
    copying a plurality of operating system files in a pristine manufactured state from said operating system back-up area data partition onto a back-up media; and
    copying a set of configuration settings from a user settings archive partition area of said data storage device to said back-up media.

16. The back-up method as claimed in claim 15, further comprising the step of:
    copying user data from a data partition of said data storage device to said back-up media.

17. The back-up method as claimed in claim 15, further comprising the step of:
    copying user data from a secondary data partition of said data storage device onto said back-up media.

18. The back-up method as claimed in claim 15, further comprising the step of:
    copying data uniquely identifying said computer entity to said back-up media.

19. A computer-readable medium or storage device containing computer-executable instructions for causing the computer entity of claim 15 to perform the steps of claim 15, wherein the computer entity is a headless computer.

20. A headless computer entity comprising
    a data processor arrangement; and
    at least one data storage device, wherein said data storage device is configured into a plurality of separate partition areas, a first of said areas having an operating system back-up area partition which is not used for direct running of an operating system by said computer entity,
    a second of said areas being a user setting archive partition area;
    the data processor arrangement being arranged for performing a recovery operation of an operating system for the computer entity by:
    (a) copying a back-up operating system from a back-up source onto the operating system back-up area partition which is not used for direct running of an operating system by said computer entity;
    (b) copying user settings data from said back-up source to the user setting archive partition area of said data storage device; and
    (c) resetting said computer entity.

21. The headless computer entity of claim 20 wherein another of said areas of said data storage device is a reserved space partition area, and the data processor arrangement is arranged for:
    copying content of said operating system back-up area partition into the reserved space partition area of said data storage device prior to copying said back-up operating system to said operating system back-up area partition.

22. The headless computer entity of claim 20 wherein the data processor arrangement is arranged for:
checking a version of said back-up operating system stored on a back-up data storage medium; and
comparing said operating system version with hardware of said computer entity.

23. The headless computer product of claim 20, wherein a further one of said areas of said data storage device is a primary operating system partition area and the data processor arrangement is arranged for:
copying said back-up operating system to said operating system back-up area partition area, copying content of said operating system back-up area partition into the reserved space partition area of said data storage device;
copying said back-up operating system from said operating system back-up partition area to the primary operating system partition area of said data storage device, wherein said resetting of said computer entity comprises (a) rebooting from said back-up copy operating system copied to said primary operating system partition, and (b) copying said user settings data from said user settings archive partition.

24. The headless computer entity of claim 20 wherein additional ones of said areas of said data storage device are (a) one or more secondary data partitions and (b) a secondary data partition area that is a data partition area for storage of data; and wherein the data processor arrangement is arranged for (a) copying user data from said back-up source to one or more data partitions of said data storage device, and (b) storing user data in the secondary data partition area.

25. The headless computer entity of claim 20, wherein an added one of said areas of said data storage device is an emergency operating system partition area and said data processor arrangement is arranged for resetting said computer entity by:
forcing said headless computer entity to boot from an emergency operating system stored in the emergency operating system partition area of said data storage device;
overwriting content of said primary operating system partition with said back-up operating system stored in said operating system back-up area partition; and
restoring client and application configuration settings from said user settings archive partition area.

26. The headless computer entity of claim 20, wherein said processor is arranged for checking a version of said back-up operating system with hardware of said computer entity by:
reading a list of supported hardware types from said operating system stored on said back-up media;
comparing said read list of supported hardware types with current hardware-type data stored on said computer entity; and
generating an error message if said current hardware-type data stored on said computer entity is incompatible with said read list of supported hardware types.

27. The headless computer entity of claim 20, wherein said processor arrangement is arranged for resetting said computer entity by:
deleting application and user configuration setting data; and
restoring said user configuration setting data from said user settings archive partition area.

28. The headless computer entity of claim 20, wherein the data processor arrangement is arranged for:
storing event data describing at least one event of said recovery operation if an error occurs in said recovery operation.

29. The headless computer entity of claim 20, wherein a further one of said areas of said data storage device is a primary operating system partition area reserved for use by said primary operating system and an additional one of said areas of said data storage device is a reserved space partition, the data processor arrangement being arranged for restoring a primary operating system to the primary operating system partition area of said data storage device reserved for use by said primary operating system if an error occurs in said recovery operation, the data processor arrangement being arranged for restoring the primary operating system to the primary operating system partition area from a copy of said primary operating system temporarily stored in the reserved space partition of said data storage device.

30. The headless computer entity of claim 20, wherein the processor arrangement is arranged for resetting said headless computer by deleting user settings data.

31. The headless computer entity of claim 20, wherein the processor arrangement is arranged for restoring: (a) said operating system back-up area partition of said data storage device and (b) at least one user data partition area.

32. A headless computer entity comprising a processor arrangement and a data storage device having plural separate partition areas including a primary operating system area, an operating system back-up area storing a pristine copy of an operating system for the headless computer entity and a user settings archive partition area, the processor arrangement being arranged for copying a plurality of operating system files in a pristine manufactured state from said operating system back-up area data partition onto a back-up media; and
copying a set of configuration settings from a user settings archive partition area of said data storage device to said back-up media.

33. The headless computer entity of claim 32 wherein one of the areas is a data partition area, the processor arrangement being arranged for copying user data from the data partition area of said data storage device to said back-up media.

34. The headless computer entity of claim 32 wherein one of the areas is a secondary data partition area, the processor arrangement being arranged for copying user data from the secondary data partition of said data storage device onto said back-up media.

35. The headless computer entity of claim 32 wherein the processor arrangement being arranged for copying data uniquely identifying said computer entity to said back-up media.

* * * * *